United States Patent
Blizzard et al.

[11] Patent Number: 5,626,964
[45] Date of Patent: May 6, 1997

[54] RADIATION-CURABLE SILICONE RESINS FORMULATED FROM AMINE ALCOHOLS, TETRA-ALKOXYSILANES AND MULTIFUNCTIONAL ACRYLATES

[75] Inventors: John D. Blizzard, Bay City; Arne R. Jarnholm, Midland; James S. Tonge, Sanford, all of Mich.

[73] Assignee: Dow Corning Corporation, Midland, Mich.

[21] Appl. No.: 547,189

[22] Filed: Oct. 24, 1995

[51] Int. Cl.$^6$ .............. B32B 27/36; B32B 9/04; C08K 5/05; C08F 2/46
[52] U.S. Cl. .............. 428/412; 522/172; 522/84; 528/20; 528/26; 428/447; 428/480
[58] Field of Search .......... 522/84, 172; 528/20, 528/21, 26; 428/412, 447, 480

[56] References Cited

U.S. PATENT DOCUMENTS

| | | | |
|---|---|---|---|
| 4,026,826 | 5/1977 | Yoshida et al. | 260/2 S |
| 4,455,205 | 6/1984 | Olson et al. | 204/159 |
| 4,486,504 | 12/1984 | Chung | 428/412 |
| 4,814,017 | 3/1989 | Yoldas et al. | 106/287 |
| 5,086,087 | 2/1992 | Misev | 522/84 |
| 5,128,391 | 7/1992 | Shustack | 522/92 |
| 5,204,379 | 4/1993 | Kubota et al. | 522/96 |
| 5,232,996 | 8/1993 | Shah et al. | 525/452 |
| 5,260,350 | 11/1993 | Wright | 522/42 |
| 5,360,834 | 11/1994 | Popall et al. | 522/28 |
| 5,426,168 | 6/1995 | Witucki | 528/23 |

FOREIGN PATENT DOCUMENTS

0544465A1  11/1992  European Pat. Off. ......... C09D 4/00

*Primary Examiner*—Susan W. Berman
*Attorney, Agent, or Firm*—Arne R. Jarnholm

[57] ABSTRACT

Radiation-curable silicone resin abrasion-resistant coatings are produced from the hydrolysis/condensation of tetra-alkoxysilanes, the condensation thereof with amine alcohol and combination with multifunctional acrylate monomers and oligomers. The cured compositions of the invention exhibit excellent abrasion resistance and offer low cost manufacture.

22 Claims, 1 Drawing Sheet

RADIATION-CURABLE SILICONE RESINS FORMULATED FROM AMINE ALCOHOLS, TETRA-ALKOXYSILANES AND MULTIFUNCTIONAL ACRYLATES

BACKGROUND OF THE INVENTION

1. Field of the Invention

The present invention relates generally to the field of radiation-curable silicone resins, and more particularly to such a resin formulated from an amine alcohol, tetra-alkoxysilane and a multifunctional acrylate.

2. Description of the Prior Art

A number of radiation-curable silicone resins are known in the prior art. Such resins are frequently used to provide abrasion-resistant coatings over easily-scratched substrates, such as polycarbonate, polyethylene and polyethylene terephthalate. The coated substrates are often used as a substitute for glass, as in the case of lenses for automobile head lamps.

Other uses may include application over plastic containers that are adapted for receiving beverages. In the case of non-refillable containers, the utility of the coating may be directed solely at providing a barrier film that decreases the gas permeability of the container. In the case of refillable containers, the utility of the coating may be directed at providing a barrier film that exhibits abrasion-resistant properties, either alone or in combination with barrier properties. Many silicone resins of this type can be impregnated with known slip aids to increase the lubricity of their cured surface.

Other applications for radiation-curable siloxane resins include casting articles of manufacture and use as bonding agents.

The silicone resin compositions of the prior art are generally formulated in a polar solvent, such as isopropyl alcohol, and utilize colloidal silica to impart abrasion resistance. The colloidal silica is usually added in the form of an aqueous dispersion.

Silicone resin compositions of the above type are disclosed in U.S. Pat. No. 4,455,205 to Olson et al. (issued Jun. 19, 1984 and assigned to General Electric Company, Schenectady, N.Y.) The coatings comprise an ultraviolet (UV) light-curable composition prepared from a multifunctional acrylate monomer, an acryloxy-functional silane and aqueous colloidal silica in a polar solvent. After mixing the components, the solvent and remaining water is removed in vacuo, with gentle heating, a step which is termed "stripping." A photoinitiator is then added so that the composition may be UV-cured.

Similarly, U.S. Pat. No. 4,486,504 to Chung, (issued Dec. 4, 1984 and also assigned to General Electric Company) discloses a UV-curable composition prepared from the addition of a multifunctional acrylate monomer to a mixture of acryloxy-functional silanes, and/or glycidoxy-functional silanes and aqueous colloidal silica. After stripping, a photoinitiator is added so that the composition may be UV-cured.

European Patent Application Publication No. 0 544 465 A1, assigned to General Electric Company, discloses a radiation-curable composition formed from: the hydrolysis product of an alkoxysilyl acrylate; aqueous colloidal silica; acrylate monomers; and a photoinitiator. Again, the example compositions are disclosed to be formulated in an alcohol solution.

U.S. Pat. No. 5,260,350 to Wright, discloses a radiation-curable composition which includes an aminoalkoxysilane and a multifunctional acrylate monomer (which form a Michael adduct) and colloidal silica in an aqueous dispersion. The composition is formulated in a polar solvent, such as isopropyl alcohol.

In the above prior art compositions, the water from the aqueous dispersion of colloidal silica causes the alkoxy groups on the silanes (and/or silyl acrylates) to hydrolyze.

The term "hydrolysis," in its strictest sense and as applied to alkoxysilanes, describes the reaction of the silanes, at the alkoxy sites, with water, thus forming silanols and alcohol. The silanols, however, are capable of undergoing a condensation reaction, to form Si—O—Si bonds and water. Accordingly, the term "hydrolysis," and its various other forms, as used herein, is not meant to include the subsequent condensation reaction. Hydrolysis, followed by condensation, will be so-described.

In the prior art compositions, it has been theorized that the colloidal silica includes residual silanol groups at the surface of the colloid particles. Further according to the theory, at least some of these residual silanol groups then undergo a condensation reaction with at least some of the silanol sites derived from the hydrolysis of the alkoxysilanes. Likewise, at least some of the hydrolyzed silanes condense with each other, thereby forming a plurality of loosely crosslinked resin nuclei, at least some of which are chemically bonded to particles of colloidal silica. According to the theory, upon curing, additional crosslinking provides a continuous resin network having colloidal silica particulate dispersed therethrough and chemically bonded therein. It is believed that the colloidal silica particles are largely responsible for imparting the compositions with abrasion-resistant properties.

In the prior art compositions, free radical polymerization of the remaining acrylate groups provides further crosslinking to the resin network, thereby "curing" the composition. The initiation of free radical polymerization can be carried out by the addition of known photoinitiators and exposure to (UV) radiation, or simple exposure to sufficiently high energy radiation such as an electron beam.

The use of aqueous colloidal silica in the formulations of such compositions has numerous drawbacks. Colloidal silica is known to have a tendency to gel, which tendency is particularly sensitive to changes in pH and solvent loss. For instance, with respect to the compositions disclosed in Wright, unless an acid is first added to reduce the residual alkalinity imparted by the aminosilane, the addition of colloidal silica to the Michael adduct/acrylate solution results in gelling or the precipitation of silica from colloidal suspension.

Furthermore, the amount of water added to the compositions of the prior art is dictated by the amount of water in the aqueous colloidal silica. Thus, in order to get an adequate amount of colloidal silica, the compositions are generally formulated with an excess of water. An excess of water creates several problems.

The degree of hydrolysis and condensation is dictated by the amount of water. Accordingly, the degree of crosslinking in the uncured composition cannot be readily controlled.

If excess water is left in the resin composition, it can have a deleterious effect on the finish of the cured coating, unless a lengthy drying time is employed before initiating cure. For that reason, the compositions are generally stripped of water. Stripping, however, also removes the polar solvent from the compositions in addition to water, greatly increasing the viscosity of the material. Therefore, polar solvent must generally be reintroduced in order to achieve a coating composition having a viscosity in a usable range.

The tendency of the prior art compositions to gel is greatly increased during the stripping step. Thus, the likelihood of manufacturing scrap materials is greatly increased.

In addition to the foregoing, aqueous colloidal silica represents a substantial portion of the cost associated with the production of the prior art resins.

Finally, the radiation-curable silicone resins of the prior art all utilize an expensive component which consists of a functionalized trialkoxysilane. The functional groups associated with the silanes permit copolymerization of the silanes with acrylate-functional components. Heretofore, such functional groups have always been attached to the trialkoxysilanes through an Si—C bond, the belief being that Si—O—C bonds are hydrolyzable and therefore cannot be effectively used to form a resin network capable of exhibiting substantial abrasion resistance.

For instance, the compositions of Chung and Olson et al. each utilize an acryloxy-functional alkoxysilane and the composition of Wright utilizes an amino-functional silane, each of which employs an Si—C bond.

Thus, a novel radiation-curable silicone resin material that did not require aqueous colloidal silica or an independently-prepared functionalized trialkoxysilane having an Si—C bond as a part of its formulation would be considered highly desirable.

BRIEF DESCRIPTION OF THE INVENTION

In accordance with the present invention, there is provided a novel radiation-curable silicone resin composition which exhibits substantial abrasion resistance and which utilizes and Si—O—C bond in the structure of the resin network. The composition of the invention comprises the reaction product of:

(A) at least one multifunctional acrylate selected from the group consisting of multifunctional acrylate monomers and oligomers;
said at least one multifunctional acrylate being present in a predetermined quantity that defines a predetermined sum of methacrylate and acrylate groups;

(B) a predetermined quantity of at least one tetra-alkoxysilane of the general formula $Si(OR)_4$ wherein each OR is an alkoxy group;

(C) at least one amine alcohol, said amine alcohol including at least one nucleophilic nitrogen-bonded hydrogen atom and at least one hydroxyl group per molecule thereof;
said hydroxyl group being condensable with an hydrolyzate formed from said tetra-alkoxysilane (B);
said amine alcohol being present in a quantity that defines a predetermined number of nucleophilic nitrogen-bonded hydrogen atoms;
the ratio of said predetermined number sum of acrylate and methacrylate groups to said predetermined number of nucleophilic nitrogen-bonded hydrogen atoms being at least about 1:1;

(D) a predetermined quantity of water which is sufficient to cause hydrolysis and condensation of said tetra-alkoxysilane (A) without gelling the combination of components (A)–(D) or causing a precipitate to form therefrom; and
said predetermined quantities of each of components (A)–(D) being present in said coating composition such that said composition, when radiation-cured, exhibits a Taber Abrasion T-500 of 15 or less.

The radiation-curable silicone resin of the invention has the advantages that it does not require the use of colloidal silica or an independently-prepared functionalized trialkoxysilane that includes an Si—C bond as part of its structure.

The aforementioned advantage, as well as other features and advantages of the present invention, are illustrated, below, by way of the following Drawing and by example in the Detailed Description of the Invention.

DETAILED DESCRIPTION OF THE INVENTION

Figure 1:
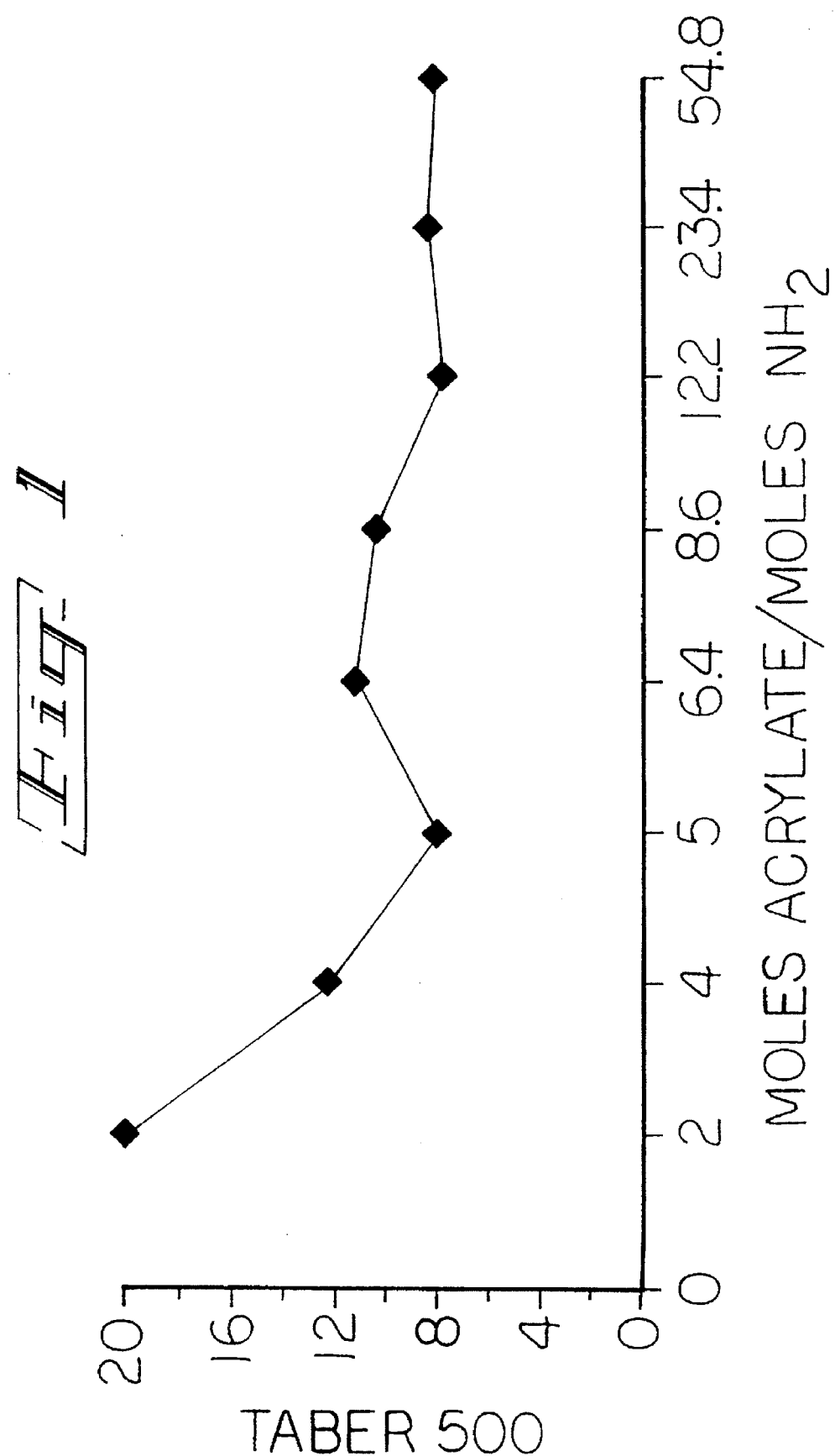
FIG. 1 is a graph of the abrasion resistance, as measured by Taber T-500 abrasion testing, as a function of the ratio of moles of acrylate: moles of $NH_2$ in various radiation-cured compositions, some of which fall within the scope of the present invention and some of which do not. It should be noted that the abscissa in FIG. 1 is a nonlinear representation of the aforementioned ratio.

In the composition of the invention, component (A) comprises at least one multifunctional acrylate selected from the group consisting of monomers and oligomers. As used herein, the term "multifunctional acrylate" means a monomer or oligomer which contains two or more functional groups selected from the group consisting of acryloxy and methacryloxy groups. The multifunctional acrylates may be used singly or in combination.

Those skilled in the art will recognize that the terms "oligomer" and "polymer" are frequently used interchangeably. Although "oligomer" is generally used to describe a relatively short polymer, the term has no generally accepted definition with respect to the number of repeating monomer units. As used herein then, the term "oligomer" is meant to include molecules that may also be properly referred to as polymers.

The only other restriction with respect to the multifunctional acrylates used in the compositions of invention, is that the acrylates be compatible with the remaining components of the invention, meaning that they do not have a deleterious effect that cannot be overcome and which defeats the desired application for the composition. Some deleterious effects can, in certain circumstances, be overcome. For instance, the use of certain multifunctional acrylates may raise the viscosity of the composition of the invention to a point where it is unusable to provide a thin abrasion-resistant coating on a substrate. If, however, the composition can be rendered usable by the addition of an appropriate diluent, then the use of that multifunctional acrylate is not considered to be excluded from the present invention. Likewise, if such a high viscosity composition has utility as a castable material, it is considered to be a part of the present invention.

Several multifunctional acrylate monomers useable as component (A) are listed below:
the following diacrylates
1,6-hexanediol diacrylate,
1,4-butanediol diacrylate,
ethylene glycol diacrylate,
diethylene glycol diacrylate,
tetraethylene glycol diacrylate,
tripropylene glycol diacrylate,
neopentyl glycol diacrylate,
1,4-butanediol dimethacrylate,
poly(butanediol) diacrylate,
tetraethylene glycol dimethacrylate,
1,3-butylene glycol diacrylate, triethylene glycol diacrylate,
triisopropylene glycol diacrylate,
polyethylene glycol diacrylate, and
bisphenol A dimethacrylate;
the following triacrylates
trimethylolpropane triacrylate,
trimethylolpropane trimethacrylate,
pentaerythritol monohydroxy triacrylate, and
trimethylolpropane triethoxy triacrylate;
the following tetra-acrylates
pentaerythritol tetra-acrylate, and
di-trimethylolpropane tetra-acrylate;
and a pentaacrylate known as
dipentaerythritol (monohydroxy) pentaacrylate.

These multifunctional acrylate monomers are commercially available from Aldrich Chemical Company, Inc., Milwaukee, Wis.

Examples of some specific multifunctional acrylate oligomers usable as component (A) are as follows:

epoxy acrylates

Bisphenol A epoxy diacrylate, available from Sartomer Company, Inc. of Exton Pa. and sold under the designation CN104. CN104 has a viscosity of 3500 cps at 65° C. and a specific gravity of 1.15.

urethane acrylates

Hexafunctional aromatic urethane acrylate with an acrylated polyol diluent which is sold under the designation Ebecryl 220 by UBC Radcure, Inc. of Louisville, Ky. Ebecryl 220 has a molecular weight of 1,000 and a viscosity of 28,000 cps at 25° C.

Aliphatic urethane diacrylate which is available under the designation Ebecryl 230 from UBC Radcure, Inc. of Louisville, Ky. Ebecryl 230 has a molecular weight of 5,000 and a viscosity of 40,000 cps at 25° C.

polyester acrylate

Tetrafunctional polyester acrylate which is sold under the designation Ebecryl 80 by UBC Radcure, Inc. of Louisville, Ky. Ebecryl 80 has a molecular weight of 1,000 and a viscosity of 3,500 cps at 25° C.

polybutadiene diacrylate available from Sartomer Company, Inc. of Exton Pa. CN300, under the designation CN300, has a molecular weight of 3,000, viscosity of 4,500–5,000 cps at 25° C.

pentaerythritol tetra-acrylate available from Sartomer Company (see above.)

As a general rule of thumb, the use of monomeric multifunctional acrylates in the composition of the invention generally results in a cured coating having hard, abrasion-resistant characteristics. On the other hand, the use of oligomeric multifunctional acrylates generally produces a slightly softer, but more flexible cured coating. The use of monomeric/oligomeric multifunctional acrylate blends can balance the desired properties of the cured coating composition of the invention.

Those skilled in the art will understand that the acrylate and methacrylate functionality of the multifunctional acrylate and the amount thereof used in the present invention will determine or define a predetermined sum of acrylate and methacrylate groups.

The tetra-alkoxysilane (B) has the general formula $Si(OR)_4$, wherein each OR is an alkoxy group. Accordingly, examples of this component include tetraethoxysilane (also called tetraethyl orthosilicate) tetramethoxysilane and tetra-n-propoxysilane. Such tetra-alkoxysilanes may be used singly or in combination. Surprisingly, the use of either too little or too much tetra-alkoxysilane produces similar results—the coating composition will exhibit poor abrasion resistance as well as diminished adhesion to most substrates.

The amine alcohol, component (C), is simply an alcohol that includes at least one reactive amine group per molecule and at least one hydroxyl group per molecule that is condensable with a hydrolyzate formed from the tetra-alkoxysilane (B). The amine alcohol may be a mono- or diamine and may be a primary or secondary amine. It may also be mono-, di-, tri- or polyhydric.

As used herein the description of "at least one" amine alcohol can include a mixture or blend of several amine alcohols with the caveat that the mixture or blend includes a predetermined number average of reactive amine groups per molecule.

The term "reactive amine group" as used above, describes an amine group having at least one nucleophilic hydrogen atom bonded to a nitrogen atom. That is to say, the amine group includes at least one such hydrogen atom that is not sterically-hindered from forming a Michael adduct with an acrylate or methacrylate group of the multifunctional acrylate (A). Thus, the number of reactive amine groups, whether the amine groups are primary or secondary and the quantity of the amine alcohol or alcohols present in the composition determines or defines a predetermined number of nitrogen-bonded nucleophilic hydrogen atoms. The amount of multifunctional acrylate relative to the amount of amine alcohol used in the invention, is such that the ratio of the predetermined sum of methacrylate and acrylate groups to the predetermined number of nucleophilic nitrogen-bonded hydrogen atoms is at least about 1:1.

Component (D), water, is added in a predetermined quantity. Too much water causes the composition to gel. Too little water results in a composition that does not exhibit the requisite abrasion resistance. Thus, the predetermined quantity is that which is sufficient to carry out the hydrolysis and condensation of the tetra-alkoxysilane (B) to the extent necessary to obtain abrasion resistance, without forming a gel.

In the preferred embodiment of the invention, the multifunctional acrylate (A), is added to the tetra-alkoxysilane (B), followed by the amine alcohol (C), and allowed to mix, thus forming a Michael adduct between the multifunctional acrylate and the amine alcohol. The formation of the Michael adduct is best carried out under conditions of constant agitation or stirring. While the reactions appears to go to substantial completion in about 30 minutes, improved abrasion-resistant properties in the cured coating are noted if the reaction is permitted to proceed for longer periods of time, e.g. up to 24 hours.

The present inventors have noted that slow reaction times are particulary pronounced when the Michael adduct is formed with methacrylate groups, as opposed to acrylate groups. When methacrylate groups are used, the reaction times can be reduced by known means, such as the employment of elevated temperatures.

Thereafter, a predetermined amount of water (D) is added and, as the tetra-alkoxysilane (B) undergoes hydrolysis and subsequent condensation reactions, the Michael adduct copolymerizes with the tetra-alkoxysilane hydrolyzate by condensation reaction at the hydroxyl site of the amine alcohol. It is believed that the residual alkalinity of the amine alcohol acts to catalyze the hydrolysis/condensation of the tetra-alkoxysilane and the copolymerization of the Michael adduct therewith.

Those skilled in the art will recognize that the hydrolysis reaction requires two molecules of water to hydrolyze two alkoxy radicals and that the condensation reaction between two hydroxyl radicals yields but a single water molecule. Thus, the water added to the composition of the invention is eventually consumed, unless added in an amount which exceeds that required to hydrolyze all the hydrolyzable alkoxy sites. As previously mentioned, however, an excess of water generally results in the formation of a gel.

It is important to note that the multifunctional acrylate (A) and the amine alcohol (C) are respectively used in quantities such that the ratio of the predetermined sum of acrylate and methacrylate groups to the predetermined number average of nitrogen-bonded nucleophilic hydrogen atoms in the composition is at least 1:1. If that ratio is less than about 1:1, the composition of the invention gels. In the preferred embodiment of the invention, the ratio is about 2.5:1 or greater. Excellent abrasion resistance has been noted with ratios as high as about 100:1. However, if the amine alcohol is completely eliminated from the composition, the cured composition exhibits substantially reduced abrasion resistance. Nonetheless, because such high ratios are tolerated, it is generally not necessary that the acrylate functionality of a reactive diluent such as acrylic acid, be taken into account in determining the ratio.

Various examples of the coating composition of the invention were prepared, coated over substrates (to a thickness of about 5 microns) and UV-cured. As used herein to describe the preparation of examples of the invention, the term "UV-cured" means that the coated substrate was subjected to about 2000 millijoules of UV radiation/cm$^2$ or greater.

It will be recognized that for purposes of abrasion resistance, coating thickness of between about 3 and 25 microns are preferred. Even more preferred are coating thicknesses of about 4 to 8 microns.

The abrasion resistance of the cured compositions of the invention was determined according to ASTM Method D-1044. The instrument used was a Teledyne model 503 Taber Abrader with two 250 gram auxiliary weights (500 gram load) for each of the CS10F abrasive wheels. In accordance with the ASTM method, coated polycarbonate Taber panels were subjected to 100 and 500 cycles on the abrader turntable (designated T-100 and T-500, respectively.) The percent change in haze, which is the criterion for determining the abrasion resistance of the coating, was determined by measuring the difference in haze of the unabraded and abraded coatings. Haze is defined as the percentage of transmitted light which, in passing through the sample, deviates from the incident beam by forward scattering. In this method, only light flux that deviates more than 2.5 degrees on average is considered to be haze. The percent haze on the coatings was determined by ASTM Method D-1003. A Gardner Haze Meter was used and the haze was calculated by measuring the amount of diffused light, dividing by the amount of transmitted light and multiplying by one hundred.

The above-described Taber abrasion testing is not limited to the use of polycarbonate test panels. In the event that a given composition does not adhere to a polycarbonate substrate, any other substantially transparent, preferably plastic, substrate may be used, so long as the composition adheres thereon.

EXAMPLES OF THE INVENTION

Example 1.

10.24 g of tetraethoxysilane, followed by 0.775 g of ethanolamine, were added to 73.7 g of pentaerythritol tetra-acrylate (Sartomer® SR-295) under conditions of constant stirring. Thereafter, 3.94 g of acrylic acid, a reactive diluent that also serves to neutralize the residual alkalinity of the ethanolamine, was added and allowed to mix for 30 minutes. The hydrolysis and condensation of the tetraethoxysilane was initiated with the addition of 4.36 g of water and mixing continued for an additional 30 minutes. Finally, 4 g of a UV initiator, (2-hydroxy-2-methyl-1-phenyl-propan-1-one, commercially available as Darocure® 1173 from Ciba Geigy Corp.) was stirred into the formulation. The resulting solution had a viscosity of 110 cps.

The composition of the invention was then coated over a 0.020 inch (0.51 mm) thick polycarbonate sheet using a #4 Meyer rod and UV cured with 2,100 mJ radiation. The cured composition exhibited abrasion resistance of T-100=4.6 and T-500=5.7.

Example 2.

A composition identical to that of Example 1 was prepared, except that no addition of acrylic acid was made. The resulting materials had a viscosity of 240 cps. The composition was then coated over polycarbonate and UV-cured as described in connection with Example 1. The cured composition exhibited abrasion resistance of T-100=1.9 and T-500=6.9.

THE RATIO OF THE SUM OF METHACRYLATE AND ACRYLATE GROUPS TO NUCLEOPHILIC NITROGEN-BONDED HYDROGEN ATOMS

Several compositions, identical to that disclosed in Example 1 except in the amount of ethanolamine, were prepared in a like manner. The compositions were then coated on polycarbonate panels and cured as previously described and subjected to Taber abrasion testing. The results of the testing, along with the ratio of the sum of the moles of acrylate to the moles of $NH_2$ is reported below, in Table 1. It is important to note the moles of acrylate set forth in Table 1 represents only the moles of acrylate groups contributed by the pentaerythritol tetra-acrylate and does not include that contributed by the acrylic acid. It is also important to note that ethanolamine contains a primary amine and, it is believed, that each $NH_2$ group includes two nucleophilic (nonsterically-hindered) nitrogen-bonded hydrogen atoms.

TABLE 1

| Example No. | ethanola-mine (g) | viscosity (cps) | moles acrylate / moles $NH_2$ | T-100 | T-500 |
|---|---|---|---|---|---|
| 3 | 50.0 | gel | 1:1 | — | — |
| 4 | 25.1 | 3810 | 2:1 | 4.3 | 20.0 |
| 5 | 12.8 | 1640 | 4:1 | 2.8 | 12.1 |
| 6 | 10.2 | 1080 | 5:1 | 3.4 | 7.9 |
| 7 | 7.7 | 606 | 6.4:1 | 2.6 | 11.1 |
| 8 | 5.7 | 559 | 8.6:1 | 2.5 | 10.2 |
| 9 | 3.9 | 443 | 12.6:1 | 3.4 | 7.5 |
| 10 | 1.9 | 299 | 23.4:1 | 2.9 | 8.0 |
| 11 | 0.8 | 237 | 54.8:1 | 1.2 | 7.6 |

Referring now to FIG. 1, there is shown a graph of the data set forth in Table 1, wherein T-500 Taber abrasion has been plotted as a function of the ratio of moles acrylate::moles $NH_2$. It should be noted that in the graph of FIG. 1 the abscissa is nonlinear, in order that the important features of the relationship not be obscured.

FIG. 1 shows that when the ratio of moles acrylate:moles $NH_2$ is in excess of about 2, the value of T-500 approaches 15 or less. Those skilled in the art will recognize that a composition exhibiting a value of T-500 of 15 or less is one that has considerable abrasion-resistance. Accordingly, those compositions having a T-500 of 15 or less (e.g. Example Nos. 5 through 11, inclusive) are considered within the scope of the present invention.

The present invention has utility for forming an abrasion-resistant coating over numerous substrates, including those fabricated from polycarbonate, polyethylene and polyethylene terephthalate. Furthermore, it is believed that the composition of the invention can be used to provided barrier film properties for articles of manufacture, including beverage containers.

The novel radiation-curable silicone resin composition of the present invention, and the features and advantages thereof, have been illustrated above by way of explanation and example. The scope of the present invention, including articles fabricated therefrom, is not, however, limited to such examples and should be judged only in accordance with the following claims and equivalents thereof.

What is claimed is:

1. A radiation-curable silicone resin composition comprising the reaction product of:
   (A) at least one multifunctional acrylate selected from the group consisting of multifunctional acrylate monomers and oligomers;
      said at least one multifunctional acrylate being present in a predetermined quantity that defines a predetermined sum of methacrylate and acrylate groups;
   (B) a predetermined quantity of at least one tetra-alkoxysilane of the general formula $Si(OR)_4$ wherein each OR is an alkoxy group;
   (C) at least one amine alcohol, said amine alcohol including at least one nucleophilic nitrogen-bonded hydrogen atom and at least one hydroxyl group per molecule thereof;
      said hydroxyl group being condensable with an hydrolyzate formed from said tetra-alkoxysilane (B);
      said amine alcohol being present in a predetermined quantity that defines a predetermined number of nucleophilic nitrogen-bonded hydrogen atoms;
      the ratio of said predetermined number sum of acrylate and methacrylate groups to said predetermined number of nucleophilic nitrogen-bonded hydrogen atoms being at least about 1:1;
   (D) a predetermined quantity of water which is sufficient to cause hydrolysis and condensation of said tetra-alkoxysilane (A) without gelling the combination of components (A)–(D) or causing a precipitate to form therefrom; and
      said predetermined quantities of each of components (A)–(D) being present in said coating composition such that said composition, when radiation-cured, exhibits a Taber Abrasion T-500 of 15 or less.

2. A composition in accordance with claim 1 wherein said coating composition, when cured, exhibits a Taber Abrasion T-500 of 10 or less and a T-100 of 5 or less.

3. A composition in accordance with claim 1 wherein said tetra-alkoxysilane is selected from the group consisting of tetramethoxy silane, tetraethoxysilane and tetra-n-propoxysilane.

4. A composition in accordance with claim 1 further comprising a photoinitiator.

5. A composition in accordance with claim 1 wherein said at least one multifunctional acrylate (A) is a monomer.

6. A composition in accordance with claim 1 wherein said at least one multifunctional acrylate (A) is an oligomer.

7. A composition in accordance with claim 1 wherein said ratio of said predetermined sum of acrylate and methacrylate groups to said predetermined number of nucleophilic nitrogen-bonded hydrogen atoms is about 2.5:1.

8. A composition in accordance with claim 1 wherein said ratio of said predetermined sum of acrylate and methacrylate groups to said predetermined number of nucleophilic nitrogen-bonded hydrogen atoms is greater than about 2.5:1 and up to about 100:1.

9. A composition in accordance with claim 1 wherein components (A), (B), (C) and (D) are present in about 75, 10, 0.8 and 4.4 parts, by weight, respectively.

10. An article of manufacture comprising:
    a substrate, said substrate presenting at least one surface;
    said at least one surface being coated with a radiation-cured coating composition;
    said radiation-cured coating composition, prior to being cured, comprising the reaction product of:
    (A) at least one multifunctional acrylate selected from the group consisting of multifunctional acrylate monomers and oligomers;
       said at least one multifunctional acrylate being present in a predetermined quantity that defines a predetermined sum of methacrylate and acrylate groups;
    (B) a predetermined quantity of at least one tetra-alkoxysilane of the general formula $Si(OR)_4$ wherein each OR is an alkoxy group;
    (C) at least one amine alcohol, said amine alcohol including at least one nucleophilic nitrogen-bonded hydrogen atom and at least one hydroxyl group per molecule thereof;
       said hydroxyl group being condensable with an hydrolyzate formed from said tetra-alkoxysilane (B);
       said amine alcohol being present in a predetermined quantity that defines a predetermined number of nucleophilic nitrogen-bonded hydrogen atoms;
       the ratio of said predetermined number sum of acrylate and methacrylate groups to said predetermined number of nucleophilic nitrogen-bonded hydrogen atoms being at least about 1:1;
    (D) a predetermined quantity of water which is sufficient to cause hydrolysis and condensation of said tetra-alkoxysilane (A) without gelling the combination of components (A)–(D) or causing a precipitate to form therefrom; and
       said predetermined quantities of each of components (A)–(D) being present in said coating composition such that said composition, when radiation-cured, exhibits a Taber Abrasion T-500 of 15 or less.

11. An article in accordance with claim 10 wherein said coating composition, when cured, exhibits a Taber Abrasion T-500 of 10 or less and a T-100 of 5 or less.

12. An article in accordance with claim 10 wherein said tetra-alkoxysilane is selected from the group consisting of tetramethoxy silane, tetraethoxysilane and tetra-n-propoxysilane.

13. An article in accordance with claim 10 wherein said coating composition, prior to being cured, further comprises a photoinitiator.

14. An article in accordance with claim 10 wherein said at least one multifunctional acrylate (A) is a monomer.

15. A article in accordance with claim 10 wherein said at least one multifunctional acrylate (A) is an oligomer.

16. An article in accordance with claim 10 wherein said ratio of said predetermined sum of acrylate and methacrylate groups to said predetermined number of nucleophilic nitrogen-bonded hydrogen atoms is about 2.5:1.

17. An article in accordance with claim 10 wherein said ratio of said predetermined sum of acrylate and methacrylate groups to said predetermined number of nucleophilic nitrogen-bonded hydrogen atoms is greater than about 2.5:1 and up to about 100:1.

18. An article in accordance with claim 10 wherein components (A), (B), (C) and (D) of said coating composition, prior to being cured, are present in about 75, 10, 0.8 and 4.4 parts, by weight, respectively.

19. An article in accordance with claim 10 wherein said substrate is fabricated from polyethylene terephthalate.

20. An article in accordance with claim 19 wherein said polyethylene terephthalate substrate is in the form of a beverage bottle.

21. An article in accordance with claim 10 wherein said substrate is fabricated from polycarbonate.

22. An article in accordance with claim 10 wherein said substrate is fabricated from polyethylene.

* * * * *